US 12,429,338 B2

United States Patent
Chen et al.

(10) Patent No.: US 12,429,338 B2
(45) Date of Patent: Sep. 30, 2025

(54) LOCALIZATION DEVICE AND LOCALIZATION METHOD FOR VEHICLE

(71) Applicant: Industrial Technology Research Institute, Hsinchu (TW)

(72) Inventors: Yu-Jhong Chen, Tainan (TW); Pei-Jung Liang, Taichung (TW); Ren-Yi Huang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 454 days.

(21) Appl. No.: 18/150,198

(22) Filed: Jan. 5, 2023

(65) Prior Publication Data

US 2024/0142237 A1 May 2, 2024

(30) Foreign Application Priority Data

Oct. 31, 2022 (TW) .................................. 111141399

(51) Int. Cl.
*G06K 9/00* (2022.01)
*G01C 21/16* (2006.01)

(52) U.S. Cl.
CPC ...... *G01C 21/1656* (2020.08); *G06T 2207/30* (2013.01)

(58) Field of Classification Search
CPC .. G01C 21/165; G01C 21/1656; G01C 21/20; G01C 21/28; G01C 21/3848;
(Continued)

(56) References Cited

U.S. PATENT DOCUMENTS 8,655,588 B2 * 2/2014 Wong ...................... G01S 17/89
701/500
8,711,206 B2 4/2014 Newcombe et al.
(Continued)

FOREIGN PATENT DOCUMENTS

CN 106482734 3/2017
CN 107646109 1/2018
(Continued)

OTHER PUBLICATIONS

Ilya Belkin et al., "Real-Time Lidar-based Localization of Mobile Ground Robot", Procedia Computer Science, vol. 186, Jan. 2021, pp. 440-448.
(Continued)

*Primary Examiner* — Shervin K Nakhjavan
(74) *Attorney, Agent, or Firm* — JCIPRNET

(57) ABSTRACT

A localization device and a localization method for a vehicle are provided. The localization device includes an inertia measurer, an encoder, an image capturing device, and a processor. The processor obtains an encoded data by the encoder to generate a first odometer data, obtains an inertial data by the inertia measurer to generate a heading angle estimation data, and obtains an environmental image data by the image capturing device to generate a second odometer data. In a first fusion stage, the processor fuses the heading angle estimation data and the first odometer data to generate first fusion data. In a second fusion stage, the processor fuses the first fusion data, the heading angle estimation data and the second odometer data to generate pose estimation data corresponding to the localization device.

20 Claims, 3 Drawing Sheets

(58) Field of Classification Search
CPC ......... G01C 22/00; G06T 2207/30244; G06T 2207/30; B62D 5/0418; G05D 1/0272; G05D 1/0246; G05D 1/0088; G05D 2111/67

See application file for complete search history.

(56) References Cited

U.S. PATENT DOCUMENTS

| | | | |
|---|---|---|---|
| 9,846,042 | B2 | 12/2017 | Babu et al. |
| 11,002,859 | B1* | 5/2021 | Zhang ................ G01S 19/393 |
| 11,481,918 | B1* | 10/2022 | Ebrahimi Afrouzi ....................... A47L 11/4008 |
| 11,937,539 | B2* | 3/2024 | Kulkarni ................ G06V 20/58 |
| 11,981,336 | B2* | 5/2024 | Varma Bhupatiraju ..................... B60W 40/10 |
| 12,105,518 | B1* | 10/2024 | Zhang ................. G05D 1/0246 |
| 2012/0155775 | A1 | 6/2012 | Ahn et al. |
| 2016/0265919 | A1 | 9/2016 | Schuller et al. |
| 2019/0323844 | A1 | 10/2019 | Yendluri et al. |
| 2020/0225363 | A1* | 7/2020 | Samii ...................... G01S 19/14 |
| 2022/0076501 | A1 | 3/2022 | Boivin et al. |
| 2024/0069560 | A1* | 2/2024 | Morse ................. G05D 1/0094 |

FOREIGN PATENT DOCUMENTS

| | | | | |
|---|---|---|---|---|
| CN | 207891709 | U * | 9/2018 | ......... E01C 23/163 |
| CN | 109029433 | | 12/2020 | |
| CN | 115200588 | A * | 10/2022 | ............ G01C 21/20 |
| CN | 115218889 | A * | 10/2022 | ......... G01C 21/206 |
| TW | 757824 | | 3/2022 | |
| TW | I771960 | | 7/2022 | |

OTHER PUBLICATIONS

Adrian Carrio et al., "Onboard Detection and Localization of Drones Using Depth Maps", IEEE Access, vol. 8, Feb. 19, 2020. pp. 30480-30490.

A. Noordin et al., "Sensor Fusion Algorithm by Complementary Filter for Attitude Estimation of Quadrotor with Low-cost IMU", Telkomnika, vol. 16, No. 2, Apr. 2018, pp. 1-9.

Jia-Shan Cui et al., "An improved SLAM based on RK-VIF: Vision and inertial information fusion via Runge-Kutta method", Defence Technology, Oct. 1, 2021, pp. 1-14.

Jinxu Liu et al., "Visual-Inertial Odometry Tightly Coupled with Wheel Encoder Adopting Robust Initialization and Online Extrinsic Calibration", 2019 IEEE/RSJ International Conference on Intelligent Robots and Systems (IROS), Nov. 4-8, 2019, pp. 5391-5397.

"Office Action of Taiwan Counterpart Application", issued on Mar. 8, 2024, p. 1-p. 15.

* cited by examiner

LOCALIZATION DEVICE AND LOCALIZATION METHOD FOR VEHICLE

CROSS-REFERENCE TO RELATED APPLICATION

This application claims the priority benefit of Taiwan application serial no. 111141399 filed on Oct. 31, 2022. The entirety of the above-mentioned patent application is hereby incorporated by reference herein and made a part of this specification.

TECHNICAL FIELD

The disclosure relates to a localization technology, and in particular relates to a localization device and a localization method for a vehicle through multiple sensing technologies and fusion data.

BACKGROUND

With the increasing applications and demands of self-driving cars, indoor autonomous moving robots, drones, etc., the localization technology for these self-moving objects is also continuously developed and improved. The current localization technology may not only determine the value of movement or rotation based on the operation of the motor on the moving object to position its own location, but also obtain its own location according to the detection results of an inertial measurer, LiDAR, or a camera, in conjunction with map information. However, the aforementioned localization technology still has its own physical limitations and cost requirements, which affect the accuracy of the localization technology.

Since the use of a single type of sensing technology has its own physical limitations, it is difficult to meet the current demand for high localization accuracy with low computing power hardware. Therefore, localization technology is still under continuous research.

SUMMARY

The embodiments of the disclosure provide a localization device and a localization method for a vehicle, which may more accurately determine the localization data and the corresponding pose of a vehicle having the localization device through various sensing technologies.

The localization device in the embodiment of the disclosure includes an inertial measurer, an encoder, an image capturing device, and a processor. The inertial measurer is used to sense inertial data of the localization device. The encoder is used to sense a motor to generate encoded data. The image capturing device is used to sense environmental image data. The processor is coupled to the inertial measurer, the encoder, and the image capturing device. The processor obtains the encoded data through the encoder, generates first odometer data based on the encoded data, obtains the inertial data through the inertial measurer, generates heading angle estimation data according to the inertial data, obtains the environmental image data through the image capturing device, and generates second odometer data according to the environmental image data. In a first fusion stage, the heading angle estimation data and the first odometer data are fused to generate first fusion data. In a second fusion stage, the first fusion data, the heading angle estima- tion data, and the second odometer data are fused to generate first pose estimation data corresponding to the localization device.

The localization method for a vehicle provided by the embodiment of the disclosure includes the following operations. Inertial data is obtained through an inertial measurer, and heading angle estimation data is generated according to the inertial data. Encoded data is obtained through an encoder, and the first odometer data is generated based on the encoded data. Environmental image data is obtained through an image capturing device, and the second odometer data is generated according to the environmental image data. In a first fusion stage, the heading angle estimation data and the first odometer data are fused to generate first fusion data. In the second fusion stage, the first fusion data, the heading angle estimation data, and the second odometer data are fused to generate first pose estimation data corresponding to the vehicle.

Based on the above, the localization device and the localization method for a vehicle described in the embodiments may more accurately determine the localization data and the corresponding pose of a vehicle having the localization device through multiple sensing technologies (e.g., an inertial measurer, an encoder, and an image capturing device) in combination with two-stage fusion of data.

DETAILED DESCRIPTION OF DISCLOSED EMBODIMENTS

In order to provide stable and accurate localization information, the embodiment of the disclosure provides a technique of fusing information from various types of sensing technologies to more accurately position objects. The aforementioned multiple different types of sensing technologies may, for example, include an inertial measurer (also referred to as an inertial measurement unit (IMU)), an encoder (also referred to as a rotary encoder or shaft encoder), a camera (also referred to as an image capturing device), etc., and at least three sensing technologies. The embodiments of the disclosure combine the information of the aforementioned sensing technologies to generate a more accurate localization result than using a single sensing technology. The technology provided in the embodiments of the disclosure may also be referred to as a heterogeneous sensing fusion localization technology. Compared with the localization method using optical radar, the cost and computing resources required by the embodiments of the disclosure are lower.

Figure 1:
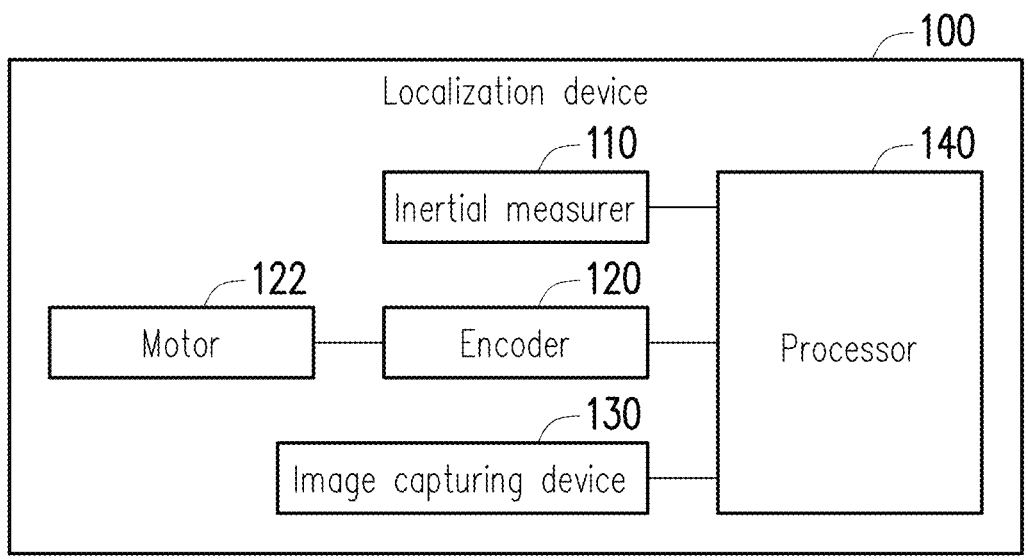
FIG. 1 is a schematic diagram of a localization device according to a first embodiment of the disclosure.

FIG. 1 is a schematic diagram of a localization device 100 according to a first embodiment of the disclosure. The localization device 100 of the embodiment of the disclosure may be installed on vehicles such as cars, autonomous moving robots, drones, etc., and provide data on the surrounding environment and the movement of the vehicle through various sensors in the localization device 100, thereby realizing the automated movement of the vehicle or the assistance to the user to move through the vehicle.

The localization device 100 mainly includes an inertial measurer 110, an encoder 120, an image capturing device 130, and a processor 140. The inertial measurer 110 is used to sense inertial data of the localization device 100. The encoder 120 is used to sense a motor 122 to generate encoded data. The image capturing device 130 is used to sense the environmental image data around the localization device 100.

In detail, the inertial measurer 110 may be an inertial measurement unit (IMU), a sensor capable of measuring the three-axis pose angle, angular velocity, and acceleration of an object. The inertial measurer 110 may include a three-axis gyroscope, a three-axis accelerometer, and a three-axis magnetometer to measure the angular velocity and acceleration of the object in three-dimensional space, so as to obtain the pose information of the object. The pose information described in this embodiment refers to the integrated information of the location information of the object and the moving direction information.

There are mainly three types of errors in the inertial measurement unit: bias error, proportional error, and background white noise. The bias error represents that the inertial measurement unit may have non-zero data even when the object is not rotating or accelerating; the proportional error represents that the inertial measurement unit may have a variable proportion between the data output and the detected input; the background white noise represents that the data output by the inertial measurement unit may contain small and rapidly changing interferences. To reduce the aforementioned errors, the inertial measurement unit must be calibrated, however these errors varies with temperature. In addition, inertial measurement units may be divided into inertial measurement units based on optic fiber gyroscopes and micro-electromechanical systems (MEMS), both of which have different costs and errors.

The encoder 120 may be divided into incremental and absolute encoders. Incremental encoders cannot accurately measure the actual moving distance due to possible tire slip on the vehicle, resulting in errors. Absolute encoders are more expensive. Another factor that affects the cost of the encoder is the rotational resolution of the encoder. An encoder with a higher rotational resolution may provide finer information, but the required cost is also higher.

The image capturing device 130 may be a monocular camera, a binocular camera, a color camera, etc. Localization using the image capturing device 130 is affected by the vehicle and the environment. The image data acquired by the image capturing device 130 on a vehicle moving too fast changes too much, which makes it difficult to compare the features in the image data, and thus the localization result cannot be obtained. On the other hand, if the environment is relatively monotonous, the light source is insufficient, or overexposed, the image capturing device 130 is not able to capture features from the image data for localization.

The accelerometer in the inertial measurer 110 is interfered by significant noise due to the vibration of the vehicle while the vehicle is moving, and the gyroscope in the inertial measurer 110 has a value drift due to the cumulative error of the angular velocity integration. The function of the encoder 120 is to count the number of revolutions of the motor shaft, which cannot be directly converted into pose information. The image capturing device 130 needs to convert the color and depth images into pose information, which has errors. Due to the limitations of the aforementioned sensing technologies, it is difficult to meet the hardware requirements of applications with low computing power and high accuracy by using a single sensing technology. On the other hand, although LiDAR sensing technology has the advantages of 360-degree peripheral perception and long sensing distance, LiDAR sensing technology needs to be paired with computing resources with high computing power to achieve real-time computing results. Relatively speaking, using an inertial measurement unit, an encoder, or an image capturing device as the sensing technology has lower cost and computing resource requirements, but the accuracy is also lower.

Therefore, in order for the localization device 100 to provide stable and accurate localization information, the embodiment of the disclosure also provides a technology of combining the data of the inertial measurer 110, the encoder 120, and the image capture data 130 for localization. Furthermore, the embodiment of the disclosure performs time synchronization on the data from the inertial measurer 110, the encoder 120, and the image capturing device 130, so that these data are arranged according to the time axis. In the first fusion stage of the data, the data of the inertial measurer 110 and the encoder 120 are fused to obtain the localization information of the first stage. Moreover, in the second fusion stage of the data, the localization information of the first stage is fused with the features captured from the data of the image capturing device 130 to calculated and generate pose estimation data. In the embodiment of the disclosure, the pose estimation data is generated by combining the information of various sensors in the aforementioned manner to generate a more accurate localization result. Compared with the localization method using LiDAR sensing technology, the cost and computing resources required by the embodiments of the disclosure are lower.

Figure 2:
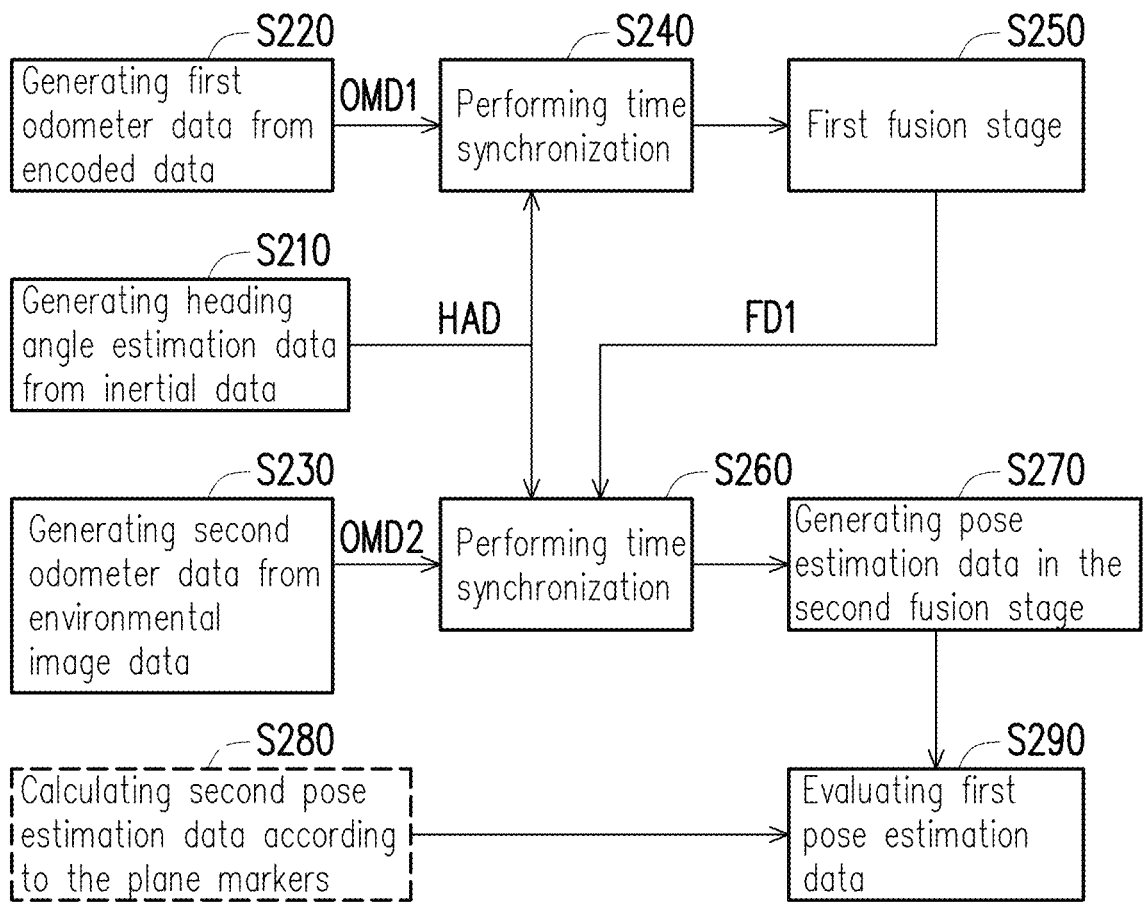
FIG. 2 is a flowchart of a localization method for a vehicle according to the first embodiment of the disclosure.

FIG. 2 is a flowchart of a localization method 200 for a vehicle according to the first embodiment of the disclosure. The localization method 200 described in FIG. 2 may be applied to the localization device 100 in FIG. 1, and the localization device 100 in FIG. 1 is disposed on a vehicle.

Referring to FIG. 1 and FIG. 2, in step S210, the processor 140 of FIG. 1 obtains inertial data through the inertial measurer 110, and generates heading angle estimation data HAD according to the inertial data. In detail, the inertial measurer 110 includes a three-axis accelerometer, a gyroscope, and an angular velocity meter. The inertial measurer 110 is typically mounted at the vehicle's center of gravity. The raw data generated by the inertial measurer 110 does not have heading angle estimation information, so the data fusion of the accelerometer, gyroscope and angular velocity meter in the inertial measurer 110 is required. The accelerometer is interfered by significant noise due to the vibration of the vehicle while the vehicle is moving, and the gyroscope has a value drift due to the cumulative error of the angular velocity integration. Therefore, the processor 140 of the embodiment of the disclosure may perform noise filtering on the aforementioned inertial data based on a filter to generate the heading angle estimation data HAD, thereby reducing the influence caused by the noise.

In this embodiment, a quaternion is used as the heading angle estimation data HAD. A quaternion is a set of 3-dimensional complex numbers that may represent any axis rotation angle in a three-dimensional space. In this embodiment, other data types may be adjusted as the heading angle estimation data HAD according to the requirements. For example, a matrix or Euler angle may be used as the heading angle estimation data HAD. The reason why this embodiment uses a quaternion as the aforementioned heading angle estimation data HAD is that the calculation amount of the quaternion is less than that of the matrix or the Euler angle, and additionally, the gimbal lock problem may be avoided.

In this embodiment, the filter used to process the inertial data generated by the inertial measurer 110 may be realized by using a Kalman filtering method, a gradient descent method, or a complementary filtering method. The computation of the Kalman filtering method is large, but its calculation accuracy is relatively high, so the requirement for the computing power of the processor 140 is relatively high.

The practice of the gradient descent method is to integrate the quaternion data obtained by the accelerometer and the magnetometer through the gradient descent method, obtain the pose data by integrating the data provided by the gyroscope, and linearly fuse the aforementioned quaternion data and the pose data to obtain the heading angle estimation information. The computation of the gradient descent method is less than that of the Kalman filtering method, and the gradient descent method may tolerate low frequency input.

The complementary filtering method is to add the error correction amount to the data generated by the gyroscope with the proportional-integral and derivative (PID) control technology, which is used in the embodiment of the disclosure and considered to be an easier-to-implement filter algorithm.

In step S220, the processor 140 of FIG. 1 obtains the encoded data through the encoder 120, and generates a first odometer data OMD1 according to the encoded data. The odometer is a standard for measuring from the initial pose to the final pose. That is to say, in order to realize the localization and navigation of the vehicle, it is necessary to know how far the vehicle has traveled and in which direction it has traveled. The processor 140 may perform dead reckoning computation on the aforementioned encoded data based on the kinematics mathematical model. For example, in the embodiment of the disclosure, a power structure with driving wheels on the left and right sides and universal wheels on the front and rear sides is used as the vehicle with the localization device 100. The vehicle is mainly moved by the driving wheels on the left and right sides. Therefore, the movement amount of the vehicle may be estimated from the number of revolutions of the motor 122 obtained by the encoder 120, so as to obtain the linear velocity Vc and the angular velocity W of the vehicle.

Figure 3:
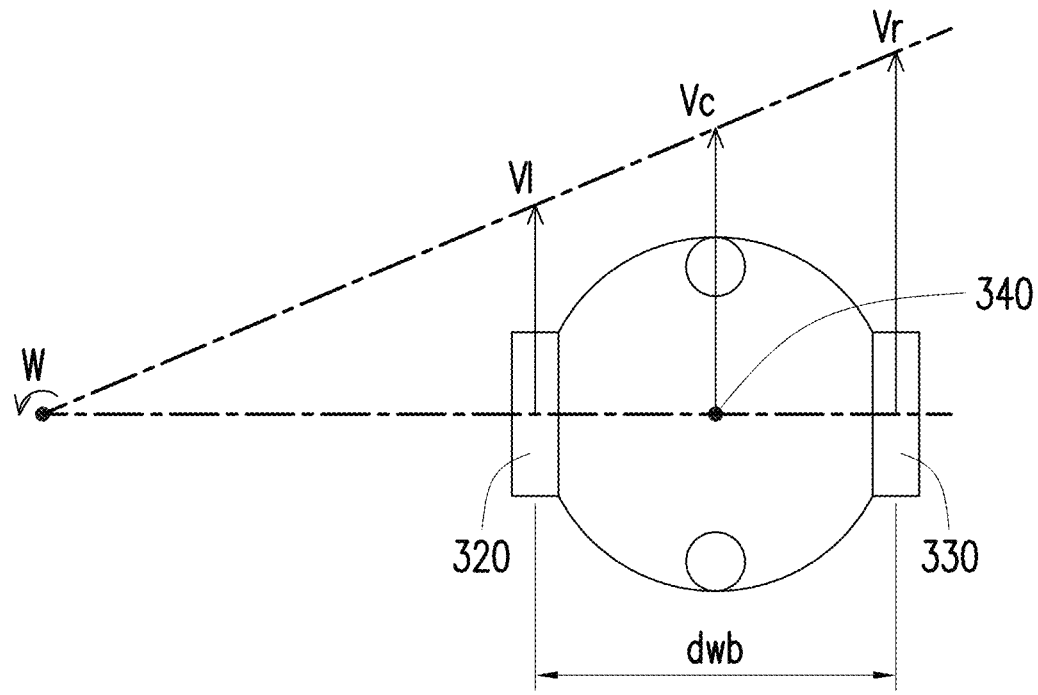
FIG. 3 is a schematic diagram of a vehicle of an embodiment of the disclosure.

FIG. 3 is a schematic diagram of a vehicle 310 of an embodiment of the disclosure. Referring to FIG. 3, the vehicle 310 has a left wheel 320, a right wheel 330, and a vehicle body center 340. The body length of the vehicle 310 is indicated as the body length dwb. The vehicle 310 may change the motion trajectory by adjusting the left wheel speed Vl of the left wheel 320 and the right wheel speed Vr of the right wheel 330, and the moving manner of the vehicle 310 is to advance along the rolling direction of the wheels. Therefore, the embodiment of the disclosure may use the kinetic model to estimate the linear velocity Vc, the angular velocity W, and the rotation radius rc of the vehicle based on the relationship between the left wheel speed and right wheel speed and the body length dwb, and use these data as the first odometer data OMD1. The calculation formula (1) of the kinematics mathematical model cited in the embodiment is as follows:

$$\begin{bmatrix} Vc \\ W \end{bmatrix} = \begin{bmatrix} \frac{Vr+Vl}{2} \\ \frac{Vr-Vl}{dwb} \end{bmatrix} = \begin{bmatrix} \frac{1}{2} & \frac{1}{2} \\ \frac{1}{dwb} & \frac{-1}{dwb} \end{bmatrix} \begin{bmatrix} Vr \\ Vl \end{bmatrix} \quad (1)$$

Returning to FIG. 2, in step S230, the processor 140 in FIG. 1 obtains the environmental image data through the image capturing device 130, and generates a second odometer data OMD2 according to the environmental image data. Specifically, the image capturing device 130 captures the aforementioned environmental image data through a lens, and the environmental image data is usually an RGB image formed by the brightness of red light (R), green light (G), and blue light (B). In order to avoid or reduce the distortion from the lens, the processor 140 first calibrates the environmental image data which is an RGB image to obtain calibrated image data. Next, the processor 140 performs pose estimation on the aforementioned calibrated image data based on a visual-inertial simultaneous localization and mapping (VI-SLAM) algorithm to generate the second odometer data OMD2.

Figure 4:
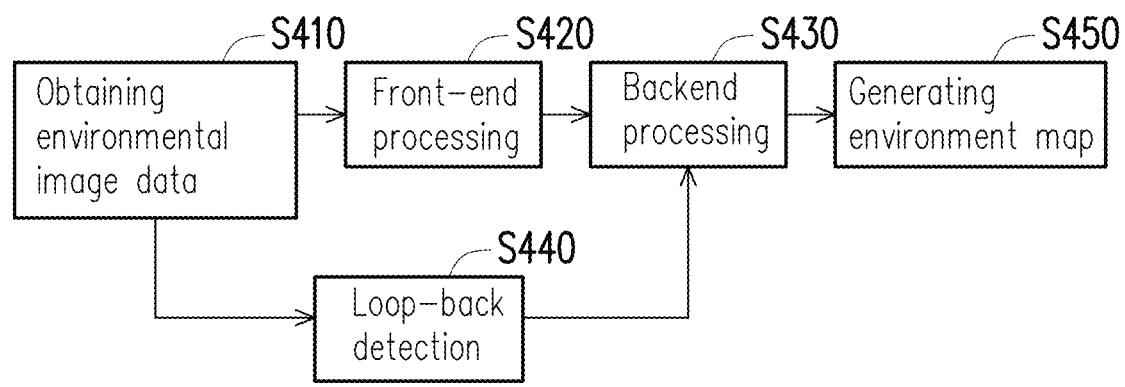
FIG. 4 is a flowchart of a visual-inertial simultaneous localization and mapping (VI-SLAM) algorithm according to an embodiment of the disclosure.

The VI-SLAM algorithm creates environmental map information based on a visual estimation method. The application of this embodiment may be realized by Mono SLAM, PTAM, LSD-SLAM, SVO, DSO, VINS, ORB-SLAM and other algorithms as VI-SLAM algorithms according to the requirements. Refer to FIG. 4 for the process of the VI-SLAM algorithm. FIG. 4 is a flowchart of a VI-SLAM algorithm according to an embodiment of the disclosure. In step S410 of FIG. 4, this embodiment obtains environmental image data from the image capturing device 130 in FIG. 1. The VI-SLAM algorithm of this embodiment includes front-end processing (step S420), backend processing (step S430), and loop-back detection (also referred to as closed-loop detection) (step S440) when performing data processing, thereby generating the environment map (step S450), so that the processor 140 in FIG. 1 may identify the pose of the vehicle in the environment through the environment map.

In the front-end processing (step S420), the processor 140 in FIG. 1 may capture feature points from the environmental image data, and compare these feature points with the original database to obtain feature point data, and may also estimate and adjust the pose of the image capturing device 130 so that the image capturing device 130 may more easily obtain the required environmental image data.

In the backend processing (step S430), the processor 140 in FIG. 1 may estimate the optimal trajectory and map of the vehicle from the noisy environmental image data. In this embodiment, the aforementioned operations may be performed on the environmental image data through methods such as Bayes theorem, maximize a posterior (MAP), and maximize likelihood estimation (MLE).

In the loop-back detection (step S440), the processor 140 in FIG. 1 uses a bag-of-words model to detect whether the environmental image data captured by the image capturing device 130 is related to the related data (e.g., feature points) captured of scenes that the vehicle has previously passed, so as to determine whether the vehicle has reached a location that has been previously passed. The embodiment of the disclosure uses ORB-SLAM3 for visual odometer estimation.

Returning to FIG. 2, in step S240, before the first fusion stage (step S250), the processor 140 performs time synchronization to the heading angle estimation data HAD and the first odometer data OMD1.

In this embodiment, a time stamp may be used to mark the time axis of the data of each sensor (i.e., the inertial measurer 110, the encoder 120, and the image capturing device 130), and the linear interpolation method may be used to realize time synchronization. For example, if the sensor information DA1 of the sensor A (e.g., the inertial measurer 110) at the time point Ta1 is known, and the time point Tc1 of the sensor C (e.g., the image capturing device 130) to be synchronized is known, then the information variation measured by sensor A per unit time ((DA1–0))/((T1–0)), multiplied by the synchronization time variation (Tc1–0), is the sensor information DA1' of the sensor A at the time point Tc1.

In step S250, the processor 140 fuses the heading angle estimation data HAD and the first odometer data OMD1 to generate the first fusion data FD1 in the first fusion stage. Since the first odometer data OMD1 obtained by using the encoder 120 generates an estimation error that cannot be eliminated, in this embodiment, a mathematical model is used to fuse the information of the inertial measuring device 110 and the encoder 120 that have been time synchronized in step S240, so as to reduce the error caused by the dead reckoning method.

Figure 5:
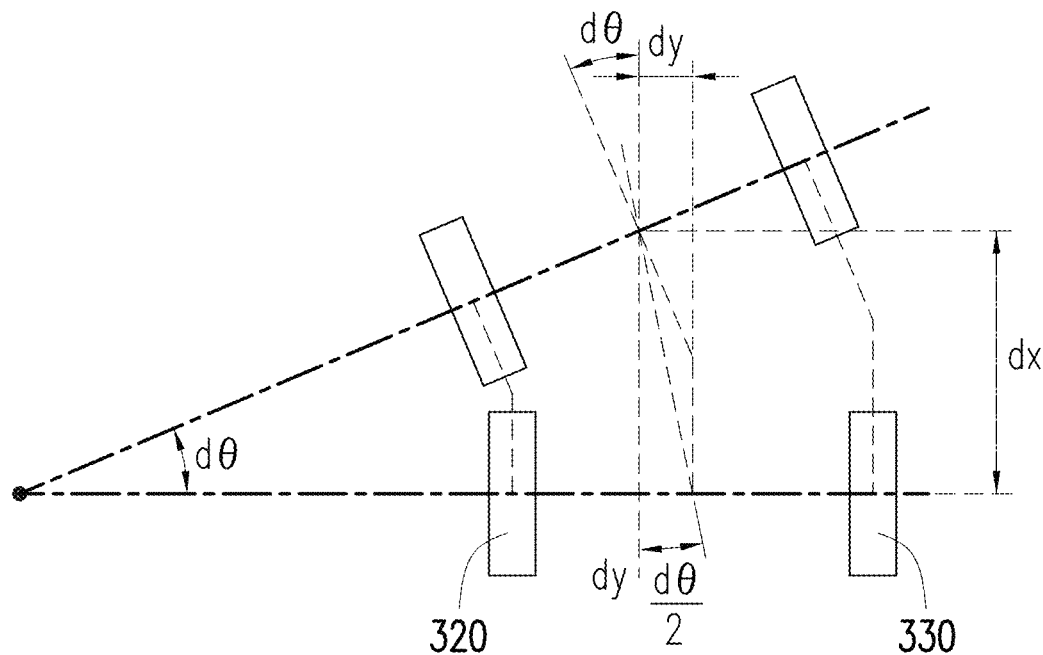
FIG. 5 is a schematic diagram of an embodiment of the disclosure illustrating step S250 with a vehicle.

The aforementioned mathematical model is described in detail here. FIG. 5 is a schematic diagram of an embodiment of the disclosure illustrating step S250 with a vehicle 310. Referring to FIG. 5, in step S250, the processor 140 uses the linear velocity in the first odometer data OMD1 and the current gyroscope angular velocity data in the heading angle estimation data HAD to calculate the movement amount value (e.g., distances dx and dy, and rotation dθ) based on the mathematical model algorithm, adjusts the observation origin from the localization device 100 (or, the vehicle body center 340) to the odometer origin of the odometer coordinate system, and calculates the first odometer data OMD1 according to the heading angle information and the accelerometer data in the heading angle estimation data HAD.

The coordinates of the vehicle body center 340 may be calculated by the following formulas:

$$dx = Vk \cdot \cos\left(\frac{W_{k-1} \cdot Te}{2}\right) \quad (2)$$

$$dy = Vk \cdot \sin\left(\frac{W_{k-1} \cdot Te}{2}\right) \quad (3)$$

$$Xk = X_{k-1} + (dx \cdot \cos(\theta_{k-1}) - dy \cdot \sin(\theta_{k-1})) + \frac{1}{2} \cdot accx \cdot Te^2 \quad (4)$$

$$Yk = Y_{k-1} + (dx \cdot \sin(\theta_{k-1}) + dy \cdot \cos(\theta_{k-1})) + \frac{1}{2} \cdot accy \cdot Te^2 \quad (5)$$

$$\theta k = \theta_{k-1} + \omega_{k-1} \cdot Te \quad (6)$$

The symbol "k" is the current time point under the unit time Te; "k–1" is the previous time point under the unit time Te. Linear velocity "Vk" may be calculated from "Xk" and "Yk". The displacement (dx, dy) of the vehicle may be calculated using the linear velocity Vk and the rotation θk. The rotation θk is calculated by multiplying the angular velocity Wk by the unit time Te. The coordinate estimation of the vehicle is obtained based on the current coordinates (Xk, Yk), in addition to the coordinate transformation from the vehicle center to the odometer coordinate system, and the displacement amount generated by the acceleration (accx, accy).

Returning to FIG. 2, in step S260, before the first fusion stage (step S250), the processor 140 performs time synchronization to the heading angle estimation data HAD and the first odometer data OMD1. The aforementioned step S240 may be referred to for the corresponding description of synchronizing sensor data, which may be realized through time stamping and linear interpolation.

In step S270, the processor 140 fuses the first fusion data FD1, the heading angle estimation data HAD and the second odometer data OMD2 in the second fusion stage to generate the first pose estimation data corresponding to the vehicle disposed with the localization device 100 in FIG. 1. The pose estimation data in this embodiment mainly includes coordinate data and heading angle data.

In this embodiment, the first fused data FD1, the heading angle estimation data HAD, and the second odometer data OMD2 are fused based on the Kalman filtering method. In this embodiment, the aforementioned Kalman filtering method may be realized by using an extended Kalman filter (EKF), an unscented Kalman filter (UKF), or other types of filtering algorithms. The extended Kalman filter is a non-linear approximation filtering algorithm, which linearizes the motion state through the Taylor expansion. Although the high-order terms are ignored, which may cause some errors, but the computational speed is relatively fast. Comparing the extended Kalman with the unscented Kalman filter, the lossless Kalman filter uses a different sampling method so that high-order terms are not ignored. Although the accuracy is higher, the computation is relatively large. For the moving vehicle in this embodiment, since the state of the vehicle continues to change, it is desired to perform the entire process in FIG. 2 with limited computation, so the embodiment of the disclosure may use the extended Kalman filter to realize the aforementioned Kalman filtering method.

In this embodiment, in addition to generating the first pose estimation data of the vehicle equipped with the localization device 100 from step S210 to step S270 in FIG. 2, the pose of the vehicle may also be determined by sensing the plane markers on the traveling path of the vehicle through the localization device 100 and the image capturing device 130. In step S280 of FIG. 2, the processor 140 also detects whether at least one plane marker is captured from the environmental image data through the image capturing device 130. The plane marker described in this embodiment is formed by a black frame and a binary matrix. The processor 140 calculates the second pose estimation data of the vehicle equipped with the localization device 100 according to the plane markers.

In detail, this embodiment may use a binary square marker called an ArUco marker (or referred to as a plane marker) laid on the traveling path of the vehicle, and obtain the map coordinate and the heading angle information corresponding to the ArUco code, as well as the relative coordinate and included angle between the binary square marker and the vehicle through an ArUco detection method, such that the pose of the vehicle may be obtained through difference calculation. The ArUco marker is a binary square marker formed by a wide black border and an internal binary matrix which determines their identifier. The black border facilitates quick detection of the image, and the binary code may verify the identifier of the square marker, which has low image complexity and high identification stability. The size of the square markers determines the size of the internal matrix. For example, a 4×4 square marker is formed by 16 bits. When the vehicle is moving, the two-dimensional code in the square marker and the four corners on the outer sides of the square marker may be photographed by the image capturing device 130 for identification. In this embodiment, the user may use the identifier of the square marker to define the corresponding content. For example, if the identifier is read as 1, this embodiment may be applied to map the identifier to a specific coordinate point (e.g., (1,0)).

Figure 6:
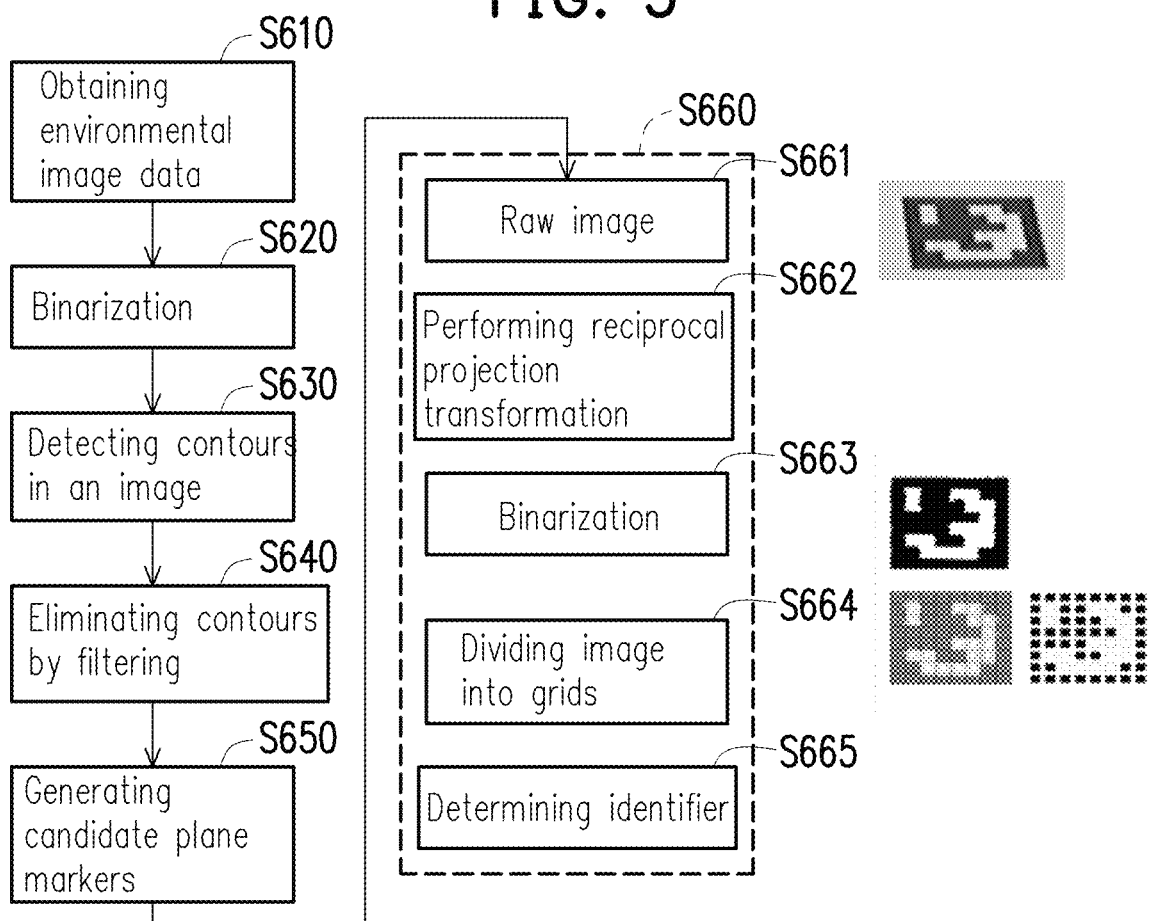
FIG. 6 is a detailed flowchart of step S280.

FIG. 6 is a detailed flowchart of step S280. Step S280 in FIG. 2 is the detection process of the plane marker, and is detailed in FIG. 6. In step S610, this embodiment obtains environmental image data through the image capturing device 130. Next, the aforementioned data is binarized (step S620), the contours in the image are detected (step S630), and then some contours that are unlikely to be plane markers are eliminated through filtering (step S640), thereby candidate plane markers are generated (step S650). After the candidate plane markers are detected, the two-dimensional code in each candidate plane marker is analyzed (step S660) to determine whether it is a plane marker.

In order to achieve this purpose, based on the raw image (step S661), this embodiment first performs reciprocal projection transformation on the region of interest (ROI) in the perspective transformed image (step S662), and then performs binarization (step S663) to separate black and white pixels, and divides the image into grids with the same bit number as the plane marker (step S664). In each storage grid, the number of black and white grids are respectively counted, and the two-dimensional code and the corresponding identifier of the storage grid are determined (step S665).

In order to obtain the relative coordinates and included angle between the plane marker and the vehicle, this embodiment obtains the pixel coordinates of the center point of the plane marker through calculation, and then transforms them to the world coordinates of the vehicle through reciprocal projection, that is, the coordinates of the plane marker are marked to know about the relative relationship between the vehicle and the plane marker. Moreover, in this embodiment, by calculating the bias angle of the plane marker in the image, the relative included angle between the vehicle and the plane marker may be known. Thereby, the processor 140 in FIG. 1 obtains the environmental image data through the image capturing device 130, and calculates the second pose estimation data of the vehicle according to the plane markers in the environmental image data.

In step S290 of FIG. 2, the processor of FIG. 1 further evaluates the first pose estimation data according to the second pose estimation data, so as to obtain a better localization effect. This embodiment uses mean square error (MSE) as the determining standard to determine the localization performance, which means the expected value of the square difference between the estimated value of the parameter and the true value of the parameter. If the value is smaller, it means that the data has better accuracy. Regarding the vehicle, it may be divided into coordinate error and heading error.

The coordinate error may be calculated by calculating the square difference of the coordinate of the vehicle and the coordinate in the pose estimation data calculated from the steps in FIG. 2 (referred to as GT coordinates), and then dividing by the total number of GT coordinates. It is expressed herein by the following equation:

$$\sum_{i=0}^{N} \frac{\text{Coordinate error of each } GT}{N} = \frac{\sum_{i=0}^{N} \sqrt{(x_i - x_{gt\_i})^2 + (y_i - y_{gt\_i})^2}}{N}$$

"N" is the total number of GT coordinates; "$x_i$" and "$y_i$" are visual odometer coordinates; "$x_{gt\_i}$" and "$y_{gt\_i}$" are GT coordinates.

The percentage of coordinate error is the average error ratio of the progressive distance, which is expressed by the following equation:

$$\sum_{i=1}^{N} \frac{\text{Coordinate error of each } GT}{\text{Progressive moving distance of each } GT} = \frac{\sum_{i=1}^{N} \frac{\sqrt{(x_i - x_{gt_i})^2 + (y_i - y_{gt_i})^2}}{\sum_{j=1}^{i} \sqrt{(x_{gt_j} - x_{gt_j-1})^2 + (y_{gt_j} - y_{gt_j-1})^2}}}{N-1}$$

The heading angle error is the average error of each GT coordinate in the heading angle, which is calculated by calculating the square interpolation of the heading angle (referred to as GT heading angle) in the pose estimation data through the heading angle of the vehicle and the steps in FIG. 2, and then dividing by the total number of GT heading angles. It is expressed herein by the following equation:

$$\sum_{i=0}^{N} \frac{\text{Heading angle error of each } GT}{N} = \frac{\sum_{i=0}^{N}(\theta_i - \theta_{gt\_i})}{N}$$

"N" is the total number of heading angle coordinates; "$\theta_i$" is the visual heading angle data; "$\theta_{gt\_i}$" is the GT heading angle.

The percentage of the heading angle error is the average error ratio of the progressive heading angle, which is expressed by the following equation:

$$\sum_{i=1}^{N} \frac{\text{Heading angle error of each } GT}{\text{Progressive rotation angle of each } GT} = \frac{\sum_{i=1}^{N} \frac{(\theta_i - \theta_{gt\_i})}{\sum_{j=1}^{i}(\theta_{gt\_j} - \theta_{gt\_j-1})}}{N-1}$$

To sum up, the localization device and the localization method for a vehicle described in the embodiments may more accurately determine the localization data and the corresponding pose of a vehicle having the localization device through multiple sensing technologies (e.g., an inertial measurer, an encoder, and an image capturing device) in combination with two-stage fusion of data.

What is claimed is:
1. A localization device, comprising:
an inertial measurer, used to sense inertial data of the localization device;
an encoder, used to sense a motor to generate encoded data;
an image capturing device, used to sense environmental image data; and
a processor, coupled to the inertial measurer, the encoder, and the image capturing device,
wherein the processor obtains the encoded data through the encoder, and generates first odometer data according to the encoded data,
the inertial data is obtained through the inertial measurer, and heading angle estimation data is generated according to the inertial data, the environmental image data is obtained through the image capturing device, and second odometer data is generated according to the environmental image data, the heading angle estimation data and the first odometer data are fused to generate first fusion data in a first fusion stage, and the first fusion data, the heading angle estimation data, and the second odometer data are fused to generate first pose estimation data corresponding to the localization device in a second fusion stage.

2. The localization device according to claim 1, wherein the processor performs dead reckoning computation on the encoded data based on a kinematics mathematical model to generate the first odometer data.

3. The localization device according to claim 1, wherein the processor performs noise filtering on the inertial data based on a filter to generate the heading angle estimation data.

4. The localization device according to claim 1, wherein the processor calibrates the environmental image data to obtain calibrated image data, and performs pose estimation on the calibrated image data based on a visual-inertial simultaneous localization and mapping (VI-SLAM) algorithm to generate the second odometer data.

5. The localization device according to claim 1, wherein the processor performs time synchronization to the heading angle estimation data and the first odometer data before the first fusion stage.

6. The localization device according to claim 5, wherein in the first fusion stage, the processor further calculates movement amount value with linear velocity in the first odometer data and current gyroscope angular velocity data in the heading angle estimation data based on a mathematical model algorithm, adjusts observation origin from a center of the localization device to an odometer origin of an odometer coordinate system, and calculates the first odometer data according to heading angle information and accelerometer data in the heading angle estimation data.

7. The localization device according to claim 1, wherein the processor performs time synchronization to the first fusion data, the heading angle estimation data, and the second odometer data, and fuses the first fusion data, the heading angle estimation data, and the second odometer data based on a Kalman filter to generate the first pose estimation data corresponding to the localization device before the second fusion stage.

8. The localization device according to claim 1, wherein the processor further detects whether at least one plane marker is captured from the environmental image data through the image capturing device, wherein the at least one plane marker comprises a frame and a binary matrix, and the processor calculates a second pose estimation data of the localization device according to the at least one plane marker.

9. The localization device according to claim 8, wherein the processor calculates the second pose estimation data of the localization device according to the at least one plane marker and a relative location of the image capturing device based on an ArUco marker detection algorithm.

10. The localization device according to claim 9, wherein the processor further evaluates the first pose estimation data according to the second pose estimation data.

11. A localization method for a vehicle, comprising:
obtaining inertial data through an inertial measurer, and generating heading angle estimation data according to the inertial data;

obtaining encoded data through an encoder, and generating first odometer data according to the encoded data;

obtaining environmental image data through an image capturing device, and generating second odometer data according to the environmental image data;

fusing the heading angle estimation data and the first odometer data to generate first fusion data in a first fusion stage; and fusing the first fusion data, the heading angle estimation data, and the second odometer data to generate first pose estimation data corresponding to the vehicle in a second fusion stage.

12. The localization method according to claim 11, wherein generating the first odometer data comprises:
performing dead reckoning computation on the encoded data based on a kinematics mathematical model to generate the first odometer data.

13. The localization method according to claim 11, wherein generating the heading angle estimation data comprises:
performing noise filtering on the inertial data based on a filter to generate the heading angle estimation data.

14. The localization method according to claim 11, wherein generating the second odometer data comprises:
calibrating the environmental image data to obtain calibrated image data; and
performing pose estimation on the calibrated image data based on a visual-inertial simultaneous localization and mapping algorithm to generate the second odometer data.

15. The localization method according to claim 11, further comprising:
performing time synchronization to the heading angle estimation data and the first odometer data before the first fusion stage.

16. The localization method according to claim 15, wherein in the first fusion stage, the localization method fuses the heading angle estimation data and the first odometer data based on a mathematical model algorithm,
wherein fusing the heading angle estimation data and the first odometer data based on the mathematical model algorithm comprises:
calculating movement amount value with linear velocity in the first odometer data and current gyroscope angular velocity data in the heading angle estimation data; and
adjusting observation origin from a center of the vehicle to an odometer origin of an odometer coordinate system, and calculating the first odometer data according to heading angle information and accelerometer data in the heading angle estimation data.

17. The localization method according to claim 11, further comprising:
time synchronizing the first fusion data, the heading angle estimation data, and the second odometer data before the second fusion stage.

18. The localization method according to claim 17, wherein generating the first pose estimation data corresponding to the vehicle comprises:
fusing the first fusion data, the heading angle estimation data, and the second odometer data based on a Kalman filter to generate the first pose estimation data corresponding to the vehicle.

19. The localization method according to claim 11, further comprising:
detecting whether at least one plane marker is captured from the environmental image data through the image capturing device, wherein the at least one plane marker comprises a frame and a binary matrix, and calculating a second pose estimation data of the vehicle according to the at least one plane marker.

20. The localization method according to claim 19, further comprising:
  evaluating the first pose estimation data according to the second pose estimation data.

* * * * *